United States Patent
Wirtz

(10) Patent No.: US 8,359,161 B2
(45) Date of Patent: Jan. 22, 2013

(54) METHOD AND APPARATUS FOR LOCATING A MAGNETIC OBJECT USING THE PERTURBATION OF THE EARTH'S MAGNETIC FIELD

(75) Inventor: Bruno Wirtz, Brest (FR)

(73) Assignee: Universite de Bretagne Occidentale, Brest (FR)

( * ) Notice: Subject to any disclaimer, the term of this patent is extended or adjusted under 35 U.S.C. 154(b) by 360 days.

(21) Appl. No.: 12/303,692

(22) PCT Filed: Jun. 6, 2007

(86) PCT No.: PCT/EP2007/055555
§ 371 (c)(1),
(2), (4) Date: May 5, 2009

(87) PCT Pub. No.: WO2007/141290
PCT Pub. Date: Dec. 13, 2007

(65) Prior Publication Data
US 2010/0049441 A1    Feb. 25, 2010

(30) Foreign Application Priority Data

Jun. 7, 2006    (FR) ...................................... 06 05030

(51) Int. Cl.
*G01V 3/38* (2006.01)
*G01R 33/02* (2006.01)
(52) U.S. Cl. .............................. 702/5; 702/152; 324/244
(58) Field of Classification Search .............. 702/5, 152; 324/244
See application file for complete search history.

(56) References Cited

U.S. PATENT DOCUMENTS

| | | | | |
|---|---|---|---|---|
| 3,663,953 | A * | 5/1972 | Salvi | 361/170 |
| 4,641,100 | A * | 2/1987 | Dzwinel | 324/330 |
| 5,182,514 | A * | 1/1993 | Rice, Jr. | 324/244 |
| 5,204,624 | A * | 4/1993 | Ueda | 324/248 |

(Continued)

FOREIGN PATENT DOCUMENTS

WO    0000848 A1    1/2000

OTHER PUBLICATIONS

Rebecca M. Brannon, Curvilinear Analysis in a Euclidean Space, University of New Mexico, First draft: Fall 1998, Present draft: Jun. 17, 2004, pp. 62-70. http://www.mech.utah.edu/~brannon/public/curvilinear.pdf.*

(Continued)

*Primary Examiner* — Jonathan C Teixeira Moffat
*Assistant Examiner* — Regis Betsch
(74) *Attorney, Agent, or Firm* — David D. Brush; Westman, Champlin & Kelly, P.A.

(57) ABSTRACT

A method is provided for tracking a magnetic object situated in an area in which a system of coordinates is defined, including an axis of abscissas, an axis ordinate and a height axis. The method includes: a phase of measuring at least one magnetic parameter in multiple measuring points in the area, in order to obtain multiple values take from this parameter in the measurement method including the following steps: construction of at least on projective magnitude; and establishment of the at least one projective magnitude on the values extracting in order to obtain an estimated value of a parameter proportional to a sensitivity within the multiple estimated points of the area, allowing the tracking of the object to take place.

25 Claims, 5 Drawing Sheets

U.S. PATENT DOCUMENTS

| | | | |
|---|---|---|---|
| 5,533,177 A * | 7/1996 | Wirtz et al. | 345/419 |
| 5,650,725 A * | 7/1997 | Powell et al. | 324/326 |
| 5,777,477 A | 7/1998 | Wynn | |
| 6,009,629 A * | 1/2000 | Gnepf et al. | 33/357 |
| 6,255,825 B1 * | 7/2001 | Seigel et al. | 324/331 |
| 6,278,948 B1 * | 8/2001 | Jorgensen et al. | 702/6 |
| 7,428,476 B1 * | 9/2008 | Toms | 703/2 |
| 2001/0009974 A1 * | 7/2001 | Reisfeld | 600/407 |
| 2004/0004480 A1 * | 1/2004 | von Wimmerspeg | 324/345 |
| 2005/0017721 A1 * | 1/2005 | McCracken et al. | 324/330 |
| 2005/0057559 A1 * | 3/2005 | Komarechka | 345/418 |
| 2005/0116717 A1 * | 6/2005 | Dransfield et al. | 324/331 |

OTHER PUBLICATIONS

Howard Anton, Calculus with Analytic Geometry, Fifth Edition 1995, pp. 741-745.*

International Search Report of foreign counterpart Application No. PCT/EP2007/055555 filed on Jun. 6, 2007.

* cited by examiner

METHOD AND APPARATUS FOR LOCATING A MAGNETIC OBJECT USING THE PERTURBATION OF THE EARTH'S MAGNETIC FIELD

CROSS-REFERENCE TO RELATED APPLICATIONS

This Application is a Section 371 National Stage Application of International Application No. PCT/EP2007/055555, filed Jun. 6, 2007 and published as WO 2007/141290 on Dec. 13, 2007, not in English.

STATEMENT REGARDING FEDERALLY SPONSORED RESEARCH OR DEVELOPMENT

None.

THE NAMES OF PARTIES TO A JOINT RESEARCH AGREEMENT

None.

FIELD OF THE DISCLOSURE

The field of the disclosure is that of the detection of objects and in particular the detection of magnetic objects corresponding to magnetic abnormalities.

The disclosure concerns more precisely a technique for locating, in particular in three dimensions, objects responsible for magnetic abnormalities.

The disclosure applies in particular, but not exclusively, to the evaluation of the susceptibility of these magnetic objects from a reading of a magnetic parameter.

BACKGROUND OF THE DISCLOSURE

The known methods for detecting magnetic abnormalities in a environment are based on a technique of inversion of a matrix, the dimensions of which depend on the pitch of a measuring grid (in the context of a reading of the total magnetic field) or on a technique of interpreting a map issuing from prospecting by a skilled man (in the context of a reading of the vertical magnetic field gradient). These known methods are detailed below.

In the context of total magnetic field (the definition of which is stated below), there exist first techniques that make it possible to transform the inverse magnetism problem into a linear system by means of hypotheses. These first techniques lead to the obtaining of a matrix describing the system that it is necessary to invert.

The matrix describing the system is linked to the pitch (the distance between two consecutive points) of a measuring grid. The conditioning of this matrix reacts as the pitch of the grid to a power proportional to the size of the grid. If this power is large, the conditioning tends abruptly towards zero as soon as the pitch of the grill passes a threshold substantially in the same way as the graph of the function $f(x)=x^n$ for n large close to the real number 1.

The transformation of the inverse problem into a linear system gives an unconvincing result because of the poor conditioning of the error. This is because these first techniques do not provide any systematic check of the error after each calculation step.

Thus these first techniques are imprecise.

In the case of the vertical gradient of the magnetic field (the definition of which is stated below), there exist second known techniques that are limited to estimating the graphical aspect of a map issuing from prospecting. Thus these second techniques lead to the conclusion that the abnormalities that have a small footprint and a high contrast on the map are abnormalities close to the surface and that the abnormalities that have a large footprint and low contrast on the map are deep abnormalities.

These second conventional techniques do not allow three-dimensional location of a magnetic object and are very imprecise.

In addition none of the aforementioned first and second techniques makes it possible to determine both the three-dimensional location and the susceptibility of a magnetic object.

SUMMARY

An aspect of the disclosure relates to a method of locating a magnetic object disposed in a environment in which a system of coordinates is defined comprising an abscissa axis, an ordinate axis and a height axis, said method comprising:
  a phase of measuring at least one magnetic parameter at a plurality of measuring points in the environment in order to obtain a plurality of recorded values of this parameter at the said measuring points that form a grid of recorded values;
  a phase of exploiting the recorded values.

According to an embodiment of the invention, in such a method, the exploitation phase comprises the following steps:
  construction of at least one projective quantity; and
    application of said at least one projective quantity to recorded values in order to obtain an estimated value of a parameter proportional to a susceptibility at a plurality of estimated points in the environment making it possible to obtain a location of said object.

The general principle of an embodiment of the invention is based on the construction and the application to a single measurement recording of a magnetic parameter of a differential operator with parameters based on at least one projective quantity making it possible to estimate a parameter proportional to a susceptibility at different points in the environment.

Thus the method according to an embodiment of the invention makes it possible to separate the problem of the location of the abnormality from that of the estimation of its magnetic susceptibility.

This is because the three-dimensional location of the object and/or its susceptibility can be calculated from the parameter proportional to a susceptibility.

Thus, unlike the conventional techniques based on a matrix inversion that requires only a single matrix calculation to resolve the inverse magnetism problem, the location method according to an embodiment of the invention uses a concatenation of calculations dependent on parameters, the adjustment of certain parameters taking place upstream of the processing of the data.

Moreover, the location method according to an embodiment of the invention provides a check on the measuring area at each calculation step.

Thus the method of locating a magnetic object according to an embodiment of the invention is precise and effective.

Preferentially, the said operating phase also comprises a step of choosing a calculation grid comprising calculation points situated in said environment.

Advantageously, the step of constructing at least one projective quantity comprises the following substeps:

construction of at least a first vector and at least a second vector;

obtaining at least one vertical curvature of a function of at least one pseudo angle with respect to height along the height axis.

obtaining at least one curvature of said at least one angle constituting said at least one projective quantity.

Thus the use of discrete differential operators that are the projective quantity or quantities is justified by the fact that they concentrate the signal. The use of a curvature formula gives rise to the calculation of a number using three distinct measuring points, which tends to limit a little the effects of the measurement errors.

The use of the angle or cosine has two advantages: firstly the error is limited and secondly, on a large scale, two vectors taken at random are statistically close to a right-angled configuration.

Therefore the random measuring error easily distances a portion of field from an abnormality configuration, the systematic measuring error produces configurations that easily emphasis its origin (for example the flight paths of the helicopter in the case where the measuring points are recorded from a helicopter).

According to a first advantageous embodiment of the invention, the magnetic parameter at a given point, referred to as the total magnetic field at said given point, is equal to the magnetic field at said given point from which the mean magnetic field in the environment is subtracted.

According to an advantageous characteristic of an embodiment of the invention, said substep of constructing the first and second vectors comprises the following substeps:

obtaining a unitary vector carrying the mean magnetic field in the environment, and for each calculation point on the calculation grid, association of a number obtained from the scalar product of said unitary vector and the total magnetic field at a first reference point when a first reference magnetic element is situated at a second reference point, in order to obtain a number grid, each of said numbers being located in the grid by an abscissa index, an ordinate index and a height index, the number grid comprising a plurality of number levels, a height index of the number grid corresponding to each number level;

for each number level of the number grid, said substep of constructing the first and second vectors also comprises the substep of obtaining the first vector from said number level and, for each height index of the number grid, a second vector from the number level corresponding to said height index.

Preferentially, in the substep of obtaining an angle formed between said at least one first vector and said at least one second vector, the following formula is used:

$$1 - \left(\frac{1}{\pi}\right) a\cos(g)$$

where g is the cosine of said angle.

Advantageously, in the substep of obtaining a curvature of said function of the angle according to said height, the following formula is used:

$$\frac{-f''}{\left((1 + \alpha \cdot f' \cdot f')^{\frac{3}{2}}\right)}$$

where f is said function of the angle with respect to said height, f' is the first derivative of said function of the angle with respect to said height and f" is the second derivative of said function of the angle with respect to said height and a is a parameter for adjusting said at least one projective quantity.

Advantageously, the exploitation phase also comprises a step of calibrating said at least one projective quantity comprising the following substeps implemented iteratively:

calculating at least one first data item proportional to a susceptibility of at least one second reference magnetic element introduced into said environment;

adjusting said at least one projective quantity according to said at least one data item.

Thus an embodiment of the invention uses a test, before application to the recording, on said at least one projective quantity on point abnormalities (or reference magnetic elements) in order to calibrate it (or adjust it). During this test, a greater precision is required on the location of point abnormalities than on the immediate evaluation of their susceptibility.

During this test, each point abnormality depth is recognised precisely, and a correction factor is associated with it.

According to an advantageous characteristic of an embodiment of the invention, the step of applying said at least one projective quantity to the recorded values comprises a preliminary substep of affine projection of at least part of the grid of values recorded by the method of least squares and of obtaining the affine residual of said projection of said at least one part of the grid of values recorded, said affine residue comprising a plurality of projected values forming a grid of projected values.

Thus, replacing a field zone by its affine residual is justified by the fact that point abnormalities or abnormalities relatively small in space are sought at the scale in question. It is considered that the signal is that of the abnormality with the addition of background noise caused by progressive variations in the local geology. It is these progressive variations that are tended to be eliminated by subtraction of the affine function that is the orthogonal projection onto a grid of fixed length and width of the magnetic reading. The reproductions of the field show clearly the disappearance of the magnetic background noise.

Preferentially, the step of applying said at least one projective quantity to the recorded values also comprises a preliminary substep of interpolating said recorded values so as to obtain an interpolation grid comprising interpolated values each corresponding to a calculation point in a subset of calculation points for the calculation grid, said preliminary interpolation substep being implemented before said preliminary affine projection substep.

Advantageously, the step of applying said at least one projective quantity to the recorded values also comprises the following substeps implemented for each of said projected values of the grid of projected values:

constructing a third vector from the number grid and the projected value grid;

applying said at least one projective quantity to said third vector in order to obtain a fourth vector;

calculating said estimated value of the parameter proportional to a susceptibility at the plurality of points estimated from the fourth vector.

According to an advantageous characteristic of an embodiment of the invention, the step of applying said at least one projective quantity to the recorded values also comprises the following substep implemented for each of said projected values of the grid of projected values:

correcting said value of said parameter by means of at least one item of information obtained in said calibration step.

Preferentially, the calculation points are situated between a height of 10 m and a height of −45 m.

According to a first advantageous embodiment of the invention, the magnetic parameter at a given point is the vertical magnetic field gradient between a first point and a second point situated respectively at a first height and a second height, said first and second points having the same abscissa and the same ordinate as said given point.

Advantageously, the substep of constructing the first and second vectors comprises the following substeps:

obtaining a unitary vector carrying the mean magnetic field in the environment, and for each calculation point of the calculation grid, associating a number obtained from the scalar product of said unitary vector and the vertical magnetic field gradient between first and second reference points when a first reference magnetic element is situated at a third reference point, in order to obtain a number grid, each of said numbers being located in the grid by an abscissa index, a y-axis index and a height index;

filtering the number grid in order to obtain a filtered grid of filtered numbers, by means of a filtering grid comprising filtering numbers, each of the filtering numbers being located in the filtering grid by an abscissa index, an ordinate index and a height index and each of the filtering numbers being obtained from its abscissa, ordinate and height indices;

calculating the first vector and the second vector by means of a diagonal extraction technique using the filtered grid.

Thus the safety cone (formed by the filtering grid) is the tool that makes it possible to exploit the fact that a shallow magnetic abnormality at one point produces on the map a contrasted zone of small surface area, while a deep abnormality at one point produces a contrasted zone with a larger diameter.

This safety cone does indeed condition the problem, and the idea of using a normed vector matrix (projection onto a unity sphere) exploits the following remark: a measurement sub-grid from which the affine residual is extracted is a vector.

The direction of this vector is more important than its norm. It alone makes it possible to define the geometric index which, point by point and on each level, is a number between −1 and 1.

Preferentially, said substep of calculating the first and second vectors comprises the following substeps:

obtaining a first matrix of the Gram matrix type from the columns of the filtered grid;

obtaining a combined matrix corresponding to a combination of the first matrix with an identity matrix possessing the same dimensions as the first matrix;

inversion of said combined matrix in order to obtain an inverted matrix;

multiplying the inverted matrix by a matrix obtained from the columns of the filtered grid.

Thus the use of a barycentric combination of a Gram matrix (first matrix) and an identity matrix (having the same dimensions as the first matrix) makes it possible to obtain an equilibrium point between the linear information contained in the recording grid on the one hand and on the other hand the poor conditioning of the Gram matrix (when used as such). A barycentre closer to the Gram matrix would favour the measurement error, which would lead to an over-representation of the measurement error, which is exactly the divergence phenomenon that the magnetic inversion seeks to avoid.

According to an advantageous characteristic of an embodiment of the invention, said filtering substep is performed using a tensor product between the number grid and the filtering grid.

Advantageously, in the substep of obtaining an angle formed between said at least one first vector and said at least one second vector, the following formula is used:

$$1 - \left(\frac{1}{\pi}\right) a\cos(G1)$$

where G1 is the cosine of said angle.

Preferentially, in the substep of obtaining a curvature of said function of the angle according to said height, the following formula is used:

$$\frac{-f''}{\left((1 + \lambda_2 \cdot f' \cdot f')^{\frac{3}{2}}\right)}$$

where f is said function of the angle with respect to said height, f' is the first derivative of said function of the angle with respect to said height and f'' is the second derivative of said function of the angle with respect to said height and λ2 is a parameter for adjusting said at least one projective quantity.

According to an embodiment of the invention, said exploitation phase also comprises a step of calibrating said at least one projective quantity comprising the following substeps implemented iteratively:

calculating at least one first data item proportional to a susceptibility of at least one second reference magnetic element introduced into said environment;

adjusting said at least one projective quantity according to said at least one data item.

Preferentially, the step of applying said at least one projective quantity to the recorded values comprises a preliminary substep of affine projection of at least part of the recorded value grid by the method of least squares and obtaining the affine residual of said projection of said at least part of the recorded value grid, said affine residual comprising a plurality of projected values forming a projected value grid.

According to an advantageous characteristic, the step of applying said at least one projected quantity to the recorded values also comprises the following substeps, implemented for each of the projected values of the projected value grid:

constructing a third vector from the number grid and the projected value grid;

applying said at least one projective quantity to said third vector in order to obtain a fourth vector;

calculating said estimated value of the parameter proportional to a susceptibility at a plurality of estimated points using the fourth vector.

Advantageously, the step of applying said at least one projective quantity to the recorded values also comprises the following substep implemented for each of said projected values of the projected value grid:

correcting said value of said parameter by means of at least one item of information obtained in said calibration step.

Preferentially, said calculation points are situated between a height of 0 m and a height of −3 m.

An embodiment of the invention also concerns a computer program product comprising program code instructions for executing the steps of the location method described previously, when the program is executed on a computer.

An embodiment of the invention also concerns an information storage means, possibly totally or partially removable, able to be read by a computer system comprising instructions for a computer program adapted to implement the location method described previously.

An embodiment of the invention also concerns a device for locating a magnetic object disposed in an environment in which there is defined a system of coordinates comprising an abscissa axis, an ordinate axis and a height axis, said device comprising:

means of measuring at least one magnetic parameter at a plurality of measuring points in the environment in order to obtain a plurality of recorded values of this parameter at said measuring points that form a recorded value grid;
means of exploiting said recorded values,
said exploitation means comprising:
means of constructing at least one projective quantity; and
means of applying said at least one projective quantity to said recorded values in order to obtain an estimated value of a parameter proportional to a susceptibility at a plurality of estimated points in the environment making it possible to obtain a location of said object.

BRIEF DESCRIPTION OF THE DRAWINGS

Other characteristics and advantages will emerge more clearly from a reading of the following description of two preferential embodiments given solely by way of illustrative and non-limitative examples, and the accompanying drawings, among which.

DETAILED DESCRIPTION OF ILLUSTRATIVE EMBODIMENTS

The method of locating magnetic objects according to an embodiment of the invention comprises two phases:

a first phase of measuring (or recording) a magnetic parameter such as the total magnetic field or the vertical magnetic field gradient at a plurality of measuring points in the environment in order to obtain a plurality of recorded values (or a recording) of this parameter at these measuring points forming a grid of recorded values;

a second phase of exploiting the recorded values.

The total magnetic field at a point corresponds to the difference between the local intensity of the magnetic field at said point and the mean intensity of the magnetic field in the environment and the vertical gradient of the magnetic field at a given point is the difference in magnetic field between a first point and a second point situated respectively at a first height and a second height, the first and second points having the same abscissa and the same ordinate as the given point.

There are two exemplary embodiments of the method of locating a magnetic object according to the invention. In the first embodiment, the magnetic parameter recorded is the total magnetic field. This first embodiment is particularly adapted to objects situated at average depths (for example an object situated between an altitude of 10 m and a depth of 43 m).

In the second embodiment, the magnetic parameter recorded is the vertical gradient of the magnetic field. This second embodiment is adapted to objects situated at shallow depths (for example an object situated between a depth of 0 m and 3 m).

Hereinafter, the steps of these two embodiments are detailed successively.

Hereinafter, the norm of the total field at the scalar product of the unitary vector carrying the mean field and of the deviation of the local field is identified with respect to the mean field (so-called approximation of the reduction-to-the-pole). Thus the following mathematical equation (1) can be written:

$$\|B-Bm\| = \langle B-Bm, u \rangle + O((B+Bm)^2) \quad (1)$$

where:
$\|.\|$ designates the Euclidean norm,
$\langle .,. \rangle$ is the canonical scalar product,
B designates the local field,
Bm corresponds to the mean field,
u is the unitary vector carrying Bm.

Figure 1:
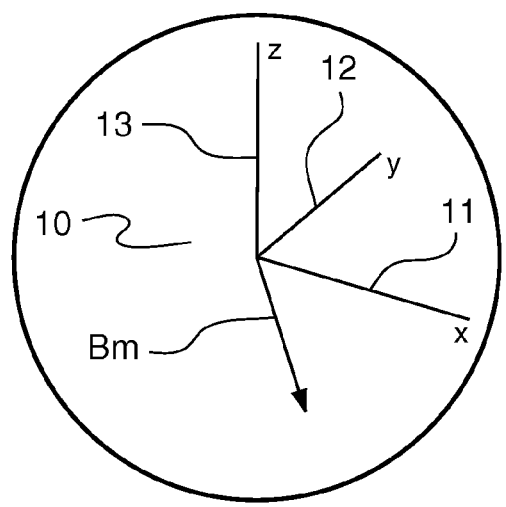
FIG. 1 illustrates the system of coordinates defined in the environment.

Hereinafter an environment is used in which a system of coordinates as illustrated by FIG. 1 is defined.

This system of coordinates 10 comprises an abscissa axis 11 that points to the east, an ordinate axis 12 that points to the south and height axis 13 that points downwards.

For example, the system of coordinates is the extended Lambert II, the abscissa and ordinate steps are both 10 m, and the vertical (height) step is 1 m, directed downwards.

The intensity of the mean magnetic field Bm is measured in the environment. With respect to magnetic north, the declination of the mean magnetic field is −64.4 degrees and its inclination is −0.4 degrees.

However, the angle between magnetic north and the north of the coordinate system 10 is 3.0 degrees. Therefore the declination of the mean magnetic field vector Bm with respect to the coordinate system 10 is 2.6 degrees.

In the chosen coordinate system, where the abscissa points towards the east and the ordinate towards the south, the reference normalized vector is given by its three coordinates abscissa x, ordinate y and height z, with:

$$\begin{cases} x = \cos(I) * \cos(D + 90°) \\ y = \cos(I) * \sin(I + 90°) \\ z = \sin(I) \end{cases} \quad (2)$$

where I is the inclination and D the declination of the mean magnetic field Bm with respect to the coordinate system 10.

1. First Embodiment

The Case of a Recording of the Total Magnetic Field Parameter

This first embodiment is adapted to aerial recordings on board helicopters or aeroplanes. It will be considered hereinafter that the aforementioned measurement phase for the measurement points in the environment is carried out from a helicopter comprising a magnetometer situated substantially at a constant height of 35 m.

Figure 2:
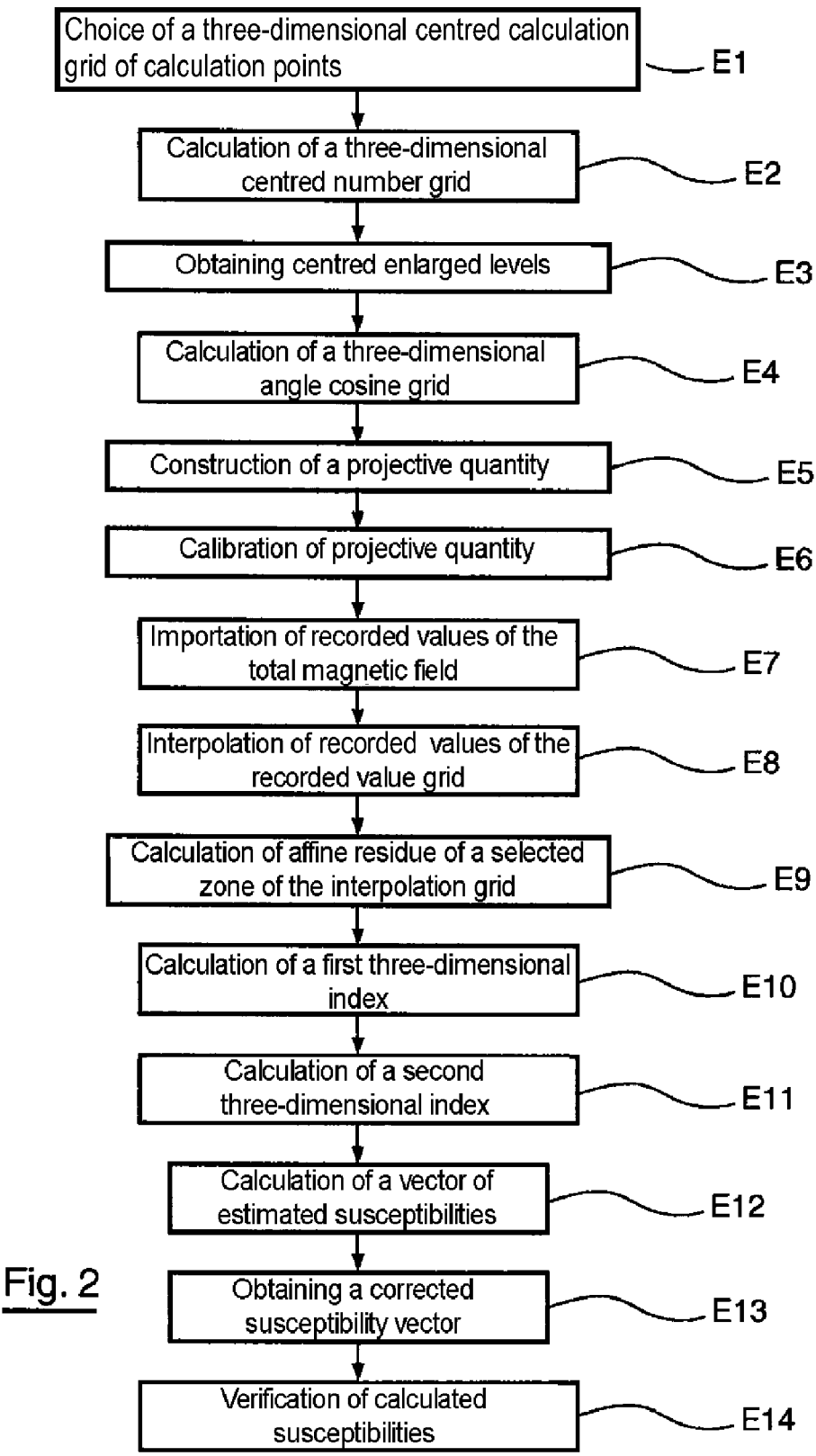
FIG. 2 is a diagram of the steps implemented in the context of the exploitation phase of the location method according to the first embodiment of the invention.

The steps of the exploitation phase according to the first embodiment of the invention are detailed below (the magnetic parameter recorded is the total magnetic field). As illustrated by FIG. 2, this exploitation phase comprises the following sub-phases:

- obtaining a calculation grid (steps E1 below);
- constructing a projective quantity (steps E2 to E5 below);
- calibrating the projective quantity (steps E6 below);
- applying the projective quantity to the recorded values (steps E7 to E14 below).

1.1 Obtaining a Calculation Grid

In a first step E1, a three-dimensional centred calculation grid of calculation points of the environment is chosen.

The three steps for the abscissa, ordinate and height of the calculation grid are chosen by the user. They are constant, but not necessarily equal to one another. The size of the calculation grid is chosen by the user according to the mean measuring height with respect to the ground and the detection depth envisaged.

The mean measuring height is 35 m with respect to ground level (as indicated above). The highest calculation point is for example fixed at 10 m and the deepest calculation point at a depth of 43 m (or −43 m in height). A calculation grid is chosen extending between the abscissa −160 m and the abscissa 160 m, between the ordinate −160 m and the ordinate 160 m and between the height −43 m and the height 10 m.

It is chosen to index the abscissa i and the ordinate j every 10 meters, from −16 to +16, that is to say 33 indices for the abscissa and for the ordinate (i between −16 and 16 and j between −16 and 16), and to index the height k every 1 meter for the height, that is to say 54 indices (k between 1 and K=54). Thus each calculation point can be identified by its indices (i,j,k).

One level of the calculation grid corresponds to a constant height index and is therefore a square table of N*M calculation points (with N=33 and M=33). The calculation grid comprises 54 levels.

Figure 3:
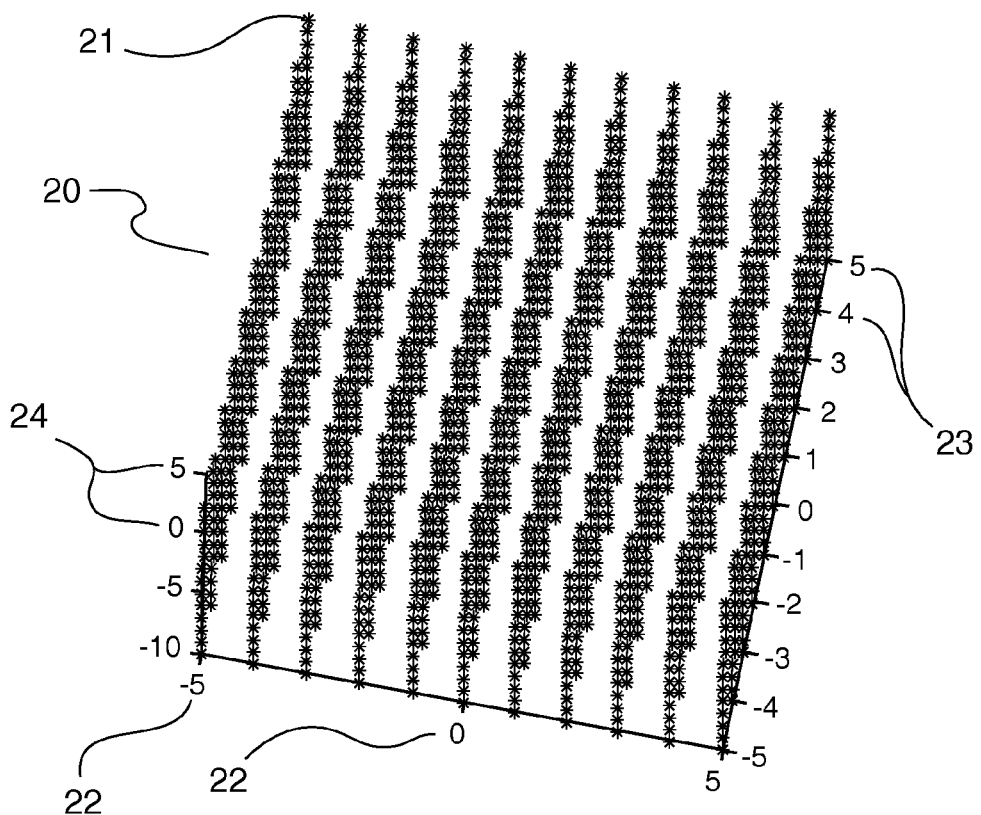
FIG. 3 presents a calculation grid used in the location methods according to the first and second embodiments of the invention.

The calculation grid 20 of calculation points 21 used in the location method according to the first embodiment of the invention is presented in relation to FIG. 3. For reasons of simplicity, only the part of the calculation grid corresponding to the abscissa indices 22 and ordinate indices 23 ranging from −5 to +5 and to the height indices 24 ranging from −10 to +5 has been shown.

With each calculation point for indices (i,j,k) of the calculation grid there is associated a position vector extending from the abscissa and ordinate point corresponding to the indices i and j and situated at the magnetometer height (i.e. 35 m) at the point of indices (0,0,k). That is to say the vector of coordinates (i,j,(35−11)+k) is associated with the calculation point (i,j,k) of the calculation grid. In this way a three-dimensional position vector centred grid is obtained.

1.2 Construction of Projective Quantity

In a second step E2, a three-dimensional centred number grid is calculated.

Using the approximation of the reduction to the pole defined above, with each calculation point of indices (i,j,k) of the calculation grid there is associated a number obtained from the scalar product of the unitary vector carrying the mean field Bm and the total magnetic field vector (or magnetic deviation) at the abscissa and ordinate point corresponding to the indices i and j and situated at the height of the magnetometer (the first reference point) resulting from a spherical abnormality of pure iron of one gram situated at the point of indices (0,0,k) (the second reference point).

The following mathematical formula (3) is used:

$$B = \frac{1}{r^3} \times (3\langle M \cdot u \rangle u - M) \qquad (3)$$

where B is the local magnetic field, r is the distance, u is the unitary vector, M the magnetic moment of a sphere of pure iron (of susceptibility 500000, of mass 1 g and of radius 3.128 mm), the moment M is carried by the unitary vector.

In the context of the present embodiment, (0,0,11-k) is obtained for the second reference point (the position of the sphere) and (10i, 10j, 35) for the first reference point. The grid contains 33*33*54 numbers.

In this way a number grid is obtained. In the same way as the calculation point grid, each of the numbers is located by its indices (i,j,k) and the number grid comprises a plurality of number levels, a height index of the number grid corresponds to each number level.

In a third step E3, for each number level of the number grid corresponding to a height index and for each pair of indices (i,j), a enlarged level is obtained centred at (i,j).

An index number level of height k (between 1 and K=54) of the number grid is fixed. This number level k is supplemented with zeros in order to obtain an enlarged level k longer and wider than the number level k and so that the number level k is centred at (i,j) in the enlarged level k.

For example, an enlarged level of 51 points by 51 points is fixed. The number level of index k of size 33 by 33 is located in the enlarged number level between its indices 26−16 and 26+16 both on the abscissa and on the ordinate.

In a fourth step E4, a three-dimensional angle cosine grid is calculated. A number level corresponding to a height index k1 (k1 between 1 and K) is fixed. Next a first vector is obtained from the enlarged level k1 centred at (0,0) by putting end to end each column of this enlarged level k1 centred at (0,0).

For each number level corresponding to a height index k2 (k2 between 1 and K) and for each index i (between −16 and 16) and j (between −16 and 16), a second vector is obtained from the enlarged level k2 centred at (i,j) by putting end to end each column of this enlarged level k2 centred at (i,j).

Then there is calculated, for each triplet of index (i,j,k2) where the index k2 runs through all the level indices (from 1 to K), the cosine of the angle between the first vector and the second vector by the algebraic formula of the scalar product divided by the product of the norms. In this way an angle cosine grid is obtained for the index k1.

This step E4 is repeated for each height index k1 (varying from 1 to K=54).

In a fifth step E5, at least one projective parameter quantity is constructed.

For a height index k1 (between 1 and K) and for each of the cosines g(i,j,k2) of the angle cosine grid corresponding to this index k1, the pseudo-angle corresponding to this cosine is calculated by virtue of the following mathematical formula:

$$f(i, j, k2) = 1 - \frac{\arccos(g(i, j, k2))}{\pi} \quad (4)$$

If g(i,j,k2), the cosine of the angle, is equal to 1, its image is equal to 1, and if the cosine is −1, its image is 0. The image of a cosine by this function is positive.

Next the vertical curvature (or variation rate) of a function of the pseudo angle with respect to height along the height axis previously calculated is defined by virtue of the following mathematical formula:

$$\text{Curvature} = \frac{-f''}{\sqrt{(1 + \alpha \cdot f'^2)^{\frac{3}{2}}}} \quad (5)$$

where α is a parameter to be tested, f' is the vertical first derivative given by the following mathematical formula:
$f_{k2}'(i,j,k2)=(f(i,j,k2+1)−f(i,j,k2))/2$ (6)
where f" is the second vertical derivative given by the following mathematical formula:

$$f_{k2}''(i,j,k2)=(f(i,j,k2+1)-2f(i,j,k2)+f(i,j,k2-1)) \quad (7)$$

The first (corresponding to k2=1) and last (corresponding to k2=54) levels of the cosine grid corresponding to the index k1 are not calculated since either k2−1 or k2+1 no longer corresponds to calculated levels of the grid. The normalization is carried out by dividing the maximum value obtained on the grid. Thus the new maximum value for the grid is systematically 1.

In this way, for each height index k1 (between 1 and K=54), there is obtained a vertical curvature grid that constitutes the projective quantity for the level k1.

In the present embodiment, the levels corresponding to 10 m of altitude (index 1) and 43 meters depth (index 54) are not calculated. All the other levels, that is to say 52 levels, are calculated. The alpha parameter is equal to 1 in the example chosen.

1.3 Calibration of the Projective Quantity

In a sixth step E6, for each index k1 (between 1 and K=54), a calibration of the projective quantity is implemented by means of a calculation of the susceptibility equivalents (according to a variant of this first embodiment, the mass equivalents or equivalents of parameters proportional to susceptibilities are calculated) in order to form a correction grid for the projective quantity.

The pseudo-proportionality formula of two vectors given by the following mathematical formula is used:

$$L(u, v) = \frac{u \cdot v}{v \cdot v} \quad (8)$$

where u and v are two vectors in the same vectorial space of finite dimension, and v is non-zero. When the vector u can be written in the form: λ.v where k is a number, L(u,v) is equal to the number lambda.

The vector u is the extract of the level k1 of the grid situated between symmetrical abscissae and ordinates.

The vector v is defined by the following linear combination:

$v=a(1)\cdot v(1)+a(2)\cdot v(2)+ \ldots +a(k)\cdot v(k)$ (9)

The curvatures c(1), c(2) ..., c(k) are the central values of the aforementioned vertical curvature grid corresponding to the height index k1. The maximum value of this curvature is 1. The family b(1), b(2), ..., b(k) is defined by the following mathematical formula:

$$b(j) = \frac{\exp(\beta \cdot c(j))}{\exp(\beta)} \quad (10)$$

with β a parameter to be fixed.

This is a family of positive numbers, where the sum of all the numbers is denoted s.

The family a(1), a(2), ..., a(k) defined by $$a(j) = \frac{b(j)}{s}$$

is a partition, that is to say a finite family of positive numbers of sum 1.

The vector v(j) corresponds to the level j of the aforementioned number grid between symmetrical indices, the centre of the number grid being of zero abscissa and zero ordinate.

In the present embodiment, the value 2 is chosen for the parameter β and the v(j) quantities are defined by the square bordered on the abscissa and ordinate by the indices −10 and +10, and u is the level k of the aforementioned number grid, bordered on the abscissa and ordinate by −10 and 10.

The number thus obtained is denoted corr(k1). It is a case of the weighting with respect to itself of a point abnormality. The index k1 runs through 2, 3, ..., K−1, the first (k1=1) and last (k1=54) levels are not calculated.

This number corr(k1) will make it possible to adjust the projective quantity corresponding to the index k1.

Figure 4:
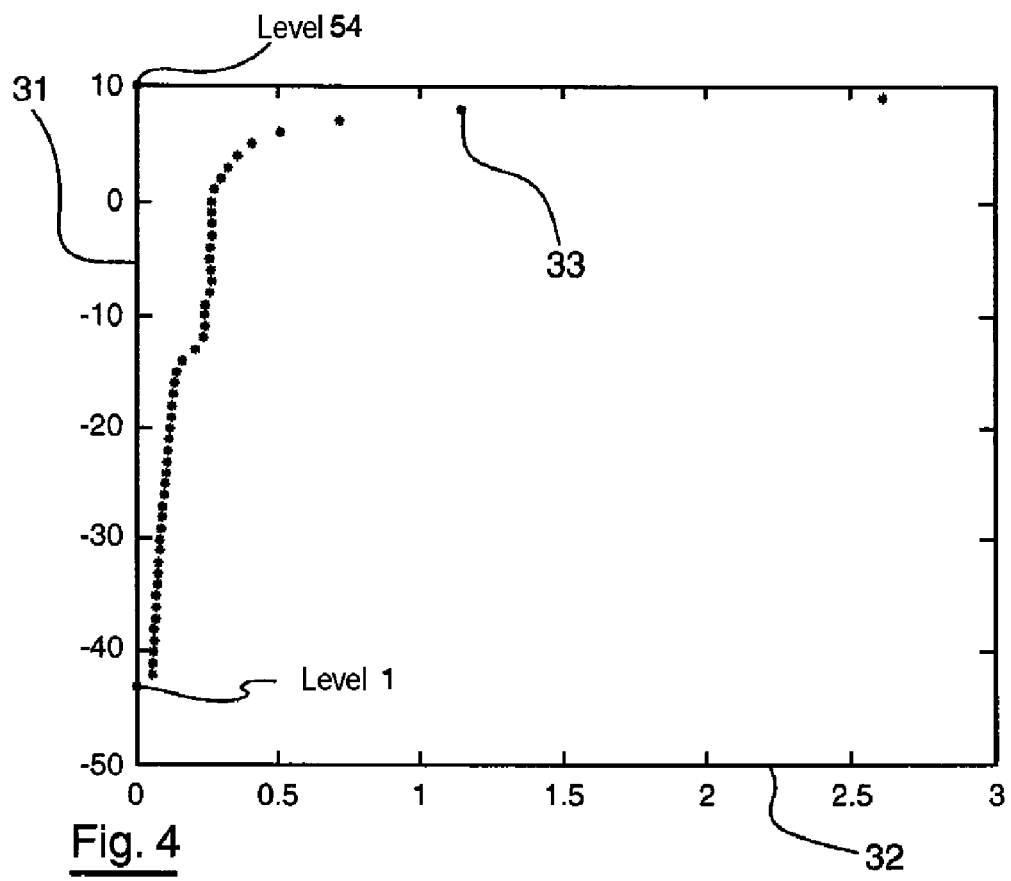
FIG. 4 is a graph depicting the depth as a function of the equivalent mass of the 54 abnormality levels in the context of the first embodiment of the location method according to the invention.

The relationship between the depth, represented by the ordinate axis 31, and the equivalent mass, represented by the abscissa axis 32, of the 54 abnormality levels 33 is presented in relation to FIG. 4. It may be noted that the levels 1 and 54 are arbitrarily zero.

The steps E2 to E6, which concern the construction of a projective quantity and its calibration, are substituted for the linear system resolution by matrices well or poorly conditioned, adapting to ideal abnormalities the parameters of the various calculation tools associated with the various steps.

1.4 Application of the Projective Quantity to the Values Recorded

In a seventh step E7, the recorded values of the total magnetic field are imported.

During this step, the recordings of the total field obtained by helicopter are imported in order to use them in the next steps of the location method according to the first embodiment of the invention. Each point recorded consists of an abscissa, an ordinate, the mean height and the intensity of the total magnetic field recorded at this point.

In an eighth step E8, an interpolation is carried out of the recorded values of the grid of values recorded so as to obtain an interpolation grid comprising interpolated values, this interpolation grid comprising the same abscissa, ordinate and height steps as the calculation grid.

This step E8 of the method makes it possible to obtain a recording of points with regular steps corresponding to the steps of the calculation grid.

The abscissa and ordinate step of the calculation grid is used. A calculation point of the calculation grid is fixed. The measuring points (each corresponding to a recorded value) are classified in the increasing order of the distances to this calculation point.

If several measuring points are exactly at the same distance from the calculation point, an order is defined between them. A triplet of distinct measuring points defined by their previous rank is taken. Their ranks are added. This sum goes from 6(1+2+3) to N+N−1+N−2, if N is the number of measurement points.

A test is carried out in order to determine whether the triplet of points is aligned. When these three points are not aligned the barycentric coordinates of the interpolation point of the interpolation grid in the reference frame formed by this triplet are calculated.

Thus, when these three barycentric coordinates are positive and the sum of the ranks is minimum among all the triplets fulfilling this barycentric condition, the positive weights P1, P2 and P3 of sum 1 are recorded, and the measurement at the interpolation point of the interpolation grid is defined by the barycentre of the three measurements at the three measuring points selected, each allocated the weights P1, P2 and P3. In this way the triangle of measuring points closest to the current interpolation point of the interpolation grid are defined such that the current interpolation point of the interpolation grid is in this triangle.

In this first embodiment according to the invention, this algorithm is limited to the points adjacent to the recording in order to reduce the interpolation calculation time.

In a ninth step E9, a zone G of size N*M is selected in the interpolation grid and its affine residual is calculated, by affine projection of this part of the interpolation grid using the method of least squares.

In this way the affine residual of this projection is obtained, this affine residual comprising a plurality of projected values forming a grid of projected values of size N*M.

The family of polynomials 1, X and Y defines the vector space of dimension 3 of the affine functions with two variables. The grids of values representing them are denoted G1, Gx and Gy.

Each of the grids of values G1, Gx, Gy of the functions 1, X and Y are each converted into a column vector by arranging each of its columns end to end. The juxtaposition of the three columns each corresponding to the grids G1, Gx and Gy forms a rectangular matrix M1 of 3 columns and N*M rows.

M1 is multiplied by its transpose so as to obtain a matrix M2, with 3 rows and 3 columns. M2 is a Gram matrix. This matrix is inverted and termed M3. The product of the matrix M3 and the matrix M1 is calculated, which forms a rectangular matrix denoted M4.

The selected zone of the interpolation grid of dimensions N*M is transformed by the same method as that applied to the grids G1, Gx and Gy into a column vector V of size N*M. The product V·M4 is a vector with 1 row and 3 columns.

Let u, v, w be the coordinates of the orthogonal projection of the selected zone of the interpolation grid onto the vector space generated by 1, X and Y. There is substituted for the selected zone of the interpolation grid the grid of projected values G2, which is given by the following mathematical formula:

$$G2 = G - u \cdot G1 - v \cdot Gx - w \cdot Gy \quad (11)$$

The projected values grid G2 is the affine projection, by the least squares method, of the selected zone of the interpolation grid.

Thus, unlike the conventional techniques for magnetic object location that use the affine part of the projection, the method according to the first embodiment of the invention uses the residual of the affine projection.

It is considered that the signal is that of the abnormality with the addition of a background noise caused by progressive variations in the local geology. It is these progressive variations that tend to be eliminated by subtraction of the affine function which is the orthogonal projection onto a grid of fixed length and width of the magnetic recording. Reproductions of the field show clearly the disappearance of the magnetic background noise.

This makes it possible to obtain a more precise location than the conventional techniques and makes it possible in particular to distinguish point abnormalities or abnormalities of small size and high susceptibility compared with abnormalities of large size and low susceptibility, whereas the conventional techniques, in particular based on matrix inversion, do not make it possible to make this discrimination.

In a tenth step E10, a construction of a third vector (otherwise designated by first three-dimensional index) is used.

For each number level corresponding to a height index k (between 1 and K=54) of the number grid (level k), the kth coefficient of the third vector is equal to the scalar product of the projected value grid G2 and the level k of the number grid.

In an eleventh step E11, the projective quantities are applied to the third vector in order to obtain a fourth vector (otherwise designated by second three-dimensional magnetic abnormality index).

In a twelfth step E12, a fifth vector is calculated, which is an estimated susceptibility vector (according to a variant of this embodiment, it is a mass vector or a vector of parameters proportional to susceptibilities), by a method similar to that described in step E6.

The first and last coefficients of this fifth vector are not calculated, and their value is chosen arbitrarily to be equal to 0, since the differential operator (or projective quantity) defined in step E5 does not allow calculation of the coefficient for the highest altitude (index k=1) or the deepest depth (index k=54). The coefficients of this fifth vector are denoted susceptibility(1)=0, susceptibility(2), ..., susceptibility(K−1), and susceptibility(K)=0.

In a thirteenth step E13, a correction to the susceptibility vector is used in order to produce a corrected susceptibility vector.

Figure 5:
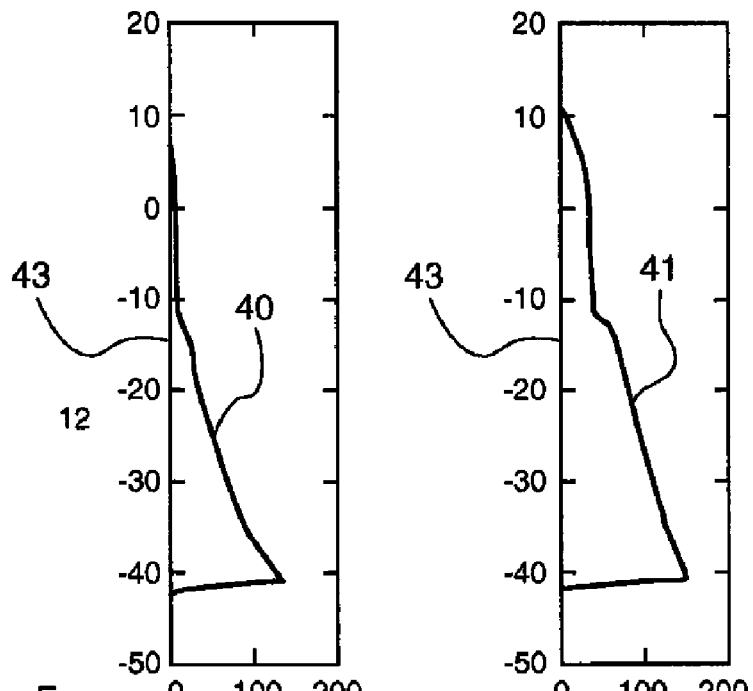
FIG. 5 is a graph depicting the susceptibility index and the corrected susceptibility index as a function of the depth in the context of this first embodiment.

The susceptibility index 40 (on the abscissa axis) and the corrected susceptibility index 41 (on the abscissa axis) corresponding the central axis (of coordinates (11,11)) of the selected zone (step E9) of the interpolation grid used in the location method according to the first embodiment of your invention are presented in relation to FIG. 5 as a function of the depth 43 (on the ordinate axis).

To do this, for each index k between 2 and K-1, the coefficient k of the corrected susceptibility vector is obtained by dividing the coefficient k of the susceptibility vector denoted susceptibility(k) by the number corr(k) obtained at step E6.

In a fourteenth step E14, a verification of the susceptibilities calculated in step E13 is implemented.

To do this, a magnetic field is reconstituted by adding to all the tri-indices (i,j,k) the variation in the total magnetic field caused by a point abnormality situated at (i,j,k), the susceptibility of which is calculated at step E13.

The aforementioned steps E7 to E14 are the application in the real case of the calculations and adjustments of the aforementioned steps E3 to E6. The estimated susceptibility vector makes it possible to obtain a location of said object.

2. Second Embodiment

The Case of a Reading of the Magnetic Field Gradient

This second embodiment is adapted to the readings made on the ground. It will be considered hereinafter that the aforementioned phase of measuring the measuring points in the environment is carried out by means of a gradiometer situated at 0.15 m from the ground comprising a high magnetometer situated at a height of 0.7 m (first height) and a low magnetometer situated at a height of 0.1 m (second height).

Figure 6:
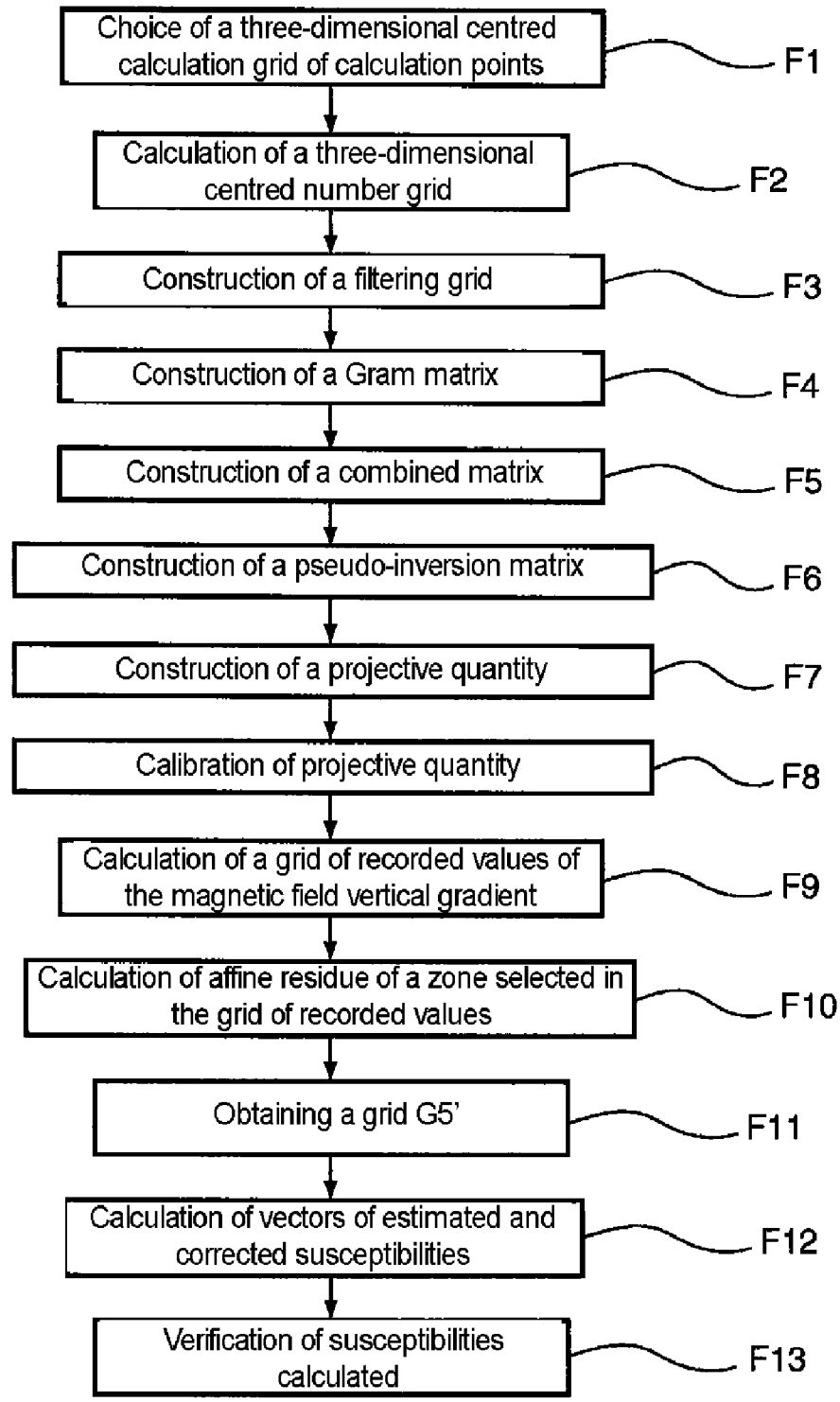
FIG. 6 is a diagram of the steps implemented in the context of the exploitation phase of the location method according to the second embodiment of the invention.

The steps of the exploitation phase according to the second embodiment of the invention are detailed below (the magnetic parameter recorded is the magnetic field gradient). As illustrated by FIG. 6, this exploitation phase comprises the following sub-phases:

obtaining a calculation grid (step F1 below);
constructing a projective quantity (steps F2 to F7 below);
calibrating the projective quantity (step F8 below);
applying the projective quantity to the values read (steps F9 to F13 below).

2.1 Obtaining a Calculation Grid

As in the first step E1 of the first embodiment of the location method according to the invention, in a first step F1 of the second embodiment, a three-dimensional centred calculation grid of calculation points of the environment is chosen.

The three steps for the abscissa, for the ordinate and for the height of the calculation grid are chosen by the user. They are constant, but not necessarily equal to one another. The size of the calculation grid is chosen by the user according to the mean measuring height with respect to the ground and the detection depth envisaged.

The mean measuring height is 0.15 m with respect to ground level (as indicated above). For example, the highest calculation point is fixed at 0 m and the deepest calculation point at a depth of 3.9 m (or a height of −3.9 m). A calculation grid is chosen extending between the abscissa −5 m and the abscissa 5 m, between the ordinate −5 m and the ordinate 5 m and between the height −3.9 m and the height 0 m.

It is chosen to index the abscissa i every 0.5 m, from −10 to +10, that is to say 21 indices for the abscissa (i between −10 and 10) and the ordinate j every 0.25 m, from −20 to +20, that is to say 41 indices for the ordinate (and j between −20 and 20), and to index the height k every 0.1 m for the height, that is to say 40 indices (k between 1 and K=40). Thus each calculation point can be identified by its indices (i,j,k).

The abscissa and ordinate indices are symmetrical, that is to say they go from an integer value −n1 to +n1, n1=10 is the maximum abscissa index, and from −m1 to +m1 for the ordinate, m1=20 is the maximum ordinate. The abscissa indices are therefore 2n1+1 in number, the ordinate indices are 2 m1+1 in number.

A level of the calculation grid corresponds to a constant height index and is therefore a square table of N×M (where N=21 and M=41) calculation points. The calculation grid comprises 40 levels.

The calculation grid presented in relation to FIG. 2 also illustrates the calculation grid used in the location method according to the second embodiment of the invention. For reasons of simplicity, only the part of the calculation grid corresponding to the abscissa 22 and ordinate 23 indices ranging from −5 to +5 and to the height indices 24 ranging from −10 to +5 has been shown.

With each point of calculation of indices (i,j,k) of the calculation grid there is associated a position vector extending from the abscissa and ordinate point corresponding to the indices i and j and situated at the height of the magnetometer (i.e. 35 m) to the index point (0,0,k). That is to say with the calculation point (i,j,k) of the calculation grid there is associated the vector of coordinates (i,j,(35−11)+k). In this way a three-dimensional position-vector centred grid is obtained.

Naturally, other depths for the deepest calculation point can be chosen in the context of an embodiment of the invention.

2.2 Construction of a Projective Quantity

In the same way as during step E2 of the first embodiment of the location method according to the invention, in a second step F2 of the second embodiment, a three-dimensional centred number grid is calculated.

By using the approximation of the reduction-to-the-pole described previously, with each calculation point of indices (i,j,k) of the calculation grid, there is associated a number obtained from the scalar product of the unitary vector carrying the mean field Bm and the vertical gradient vector of the magnetic field between the abscissa and ordinate points (first and second reference points) corresponding to the indices i and j and situated at the heights respectively of the high magnetometer and low magnetometer resulting from a spherical abnormality of pure iron of 1 gram situated at the index point (0,0,k) (third reference point).

Once again the mathematical formula (3) previously defined in the context of the second step E2 of the first embodiment according to the invention is used.

(0; 0; −0.15-10 k) is obtained for the position of the sphere with respect to the low magnetometer of the sensor (second height: 0.1 m), and (0.50i; 0.25j; −0.75-0.10 k) for the position of the sphere with respect to the high magnetometer of the sensor (first height: 0.7 m). The number grid contains N*M*K numbers, with N=21, M=41 and K=40.

In this way a number grid is obtained. In the same way as the calculation point grid, each of the numbers is referenced by its indices (i,j,k) and the number grid comprises a plurality of number levels, to each number level there corresponds a height index of the number grid.

In a third step F3, there is constructed a filtering grid (also called a weighting grid) of filtering numbers in the form of a three-dimensional matrix containing N*M*K filtering numbers (with N=21, M=41 and K=40).

For each level of the filtering grid corresponding to a height index k, a parameter δ is defined corresponding to a distance and dependent on the depth, for example δ(k)=0.75+0.07 k (the coefficients 0.75 and 0.07 of this affine expression of the parameter δ are obtained after numerous tests and simulations).

For a level of the filtering grid corresponding to the height index k, the value δ(k) is calculated. In the level k, the distance between the origin (0,0) and the abscissa and ordinate point (i,j) is given by the expression: $\sqrt{i^2+j^2}$. The filtering number corresponding to the indices (i,j,k) of the filtering grid is then defined by:

$$\max\left(0, 1 - \left(\frac{i^2 + j^2}{\delta(k)^2}\right)\right) \quad (12)$$

Expression (12) always takes the value 1 in (0,0,k) whatever the value of k.

This filtering grid forms a safety cone broadening towards the base.

Figure 7:
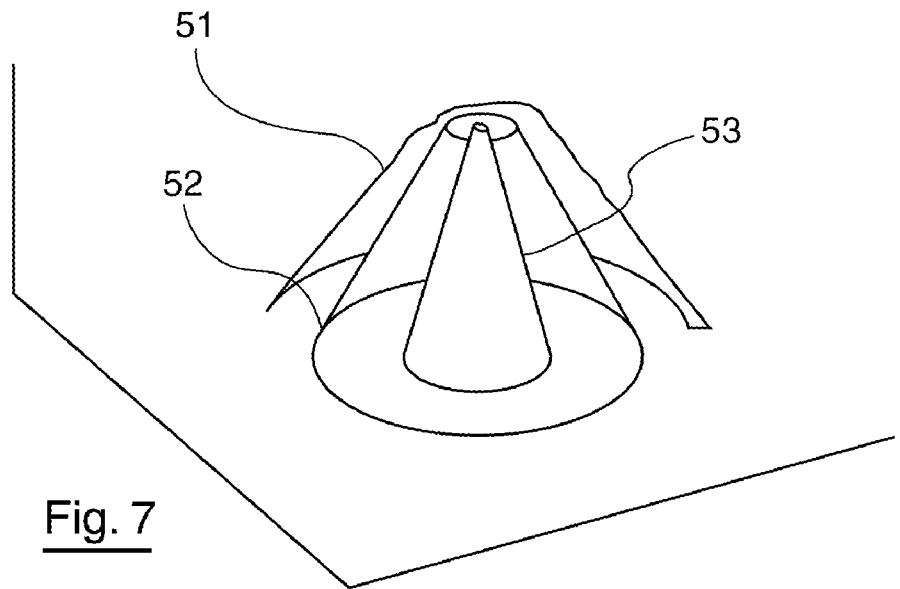
FIG. 7 is a diagram depicting the levels corresponding respectively to the values of the parameter δ 0.9, 0.5 and 0.05 of the transparency cone on a square base with sides of 5 m and a depth of 0 to 4 m in the context of the second embodiment of the invention.

The levels 51, 52, 53 corresponding respectively to the values of the parameter δ 0.9, 0.5 and 0.05 of the cone are represented by transparency on a square base with sides of 5 m and a depth of 0 to 4 m on the diagram in FIG. 7.

In a fourth step F4, a Gram matrix is constructed from a filtering by means of a filtering grid of the number grid.

A first filtered grid C(i,j,k) is calculated by virtue of the tensor product defined by the following equation:

$$C(i,j,k)=A(i,j,k)\cdot B(i,j,k) \quad (13)$$

where A(i,j,k) and B(i,j,k) correspond to the number and filtering grids containing N*M*K numbers defined respectively during steps F2 and F3 (with N=21, M=41 and K=40).

In this way the first three-dimensional filtered grid of filtered numbers C(i,j,k) is obtained.

Each of the K levels of the first filtered grid is then transformed into an N*M row vector by putting each column of this level end to end. In this way a rectangular matrix M1 with N*M rows and K columns is obtained.

Each column vector of the matrix M1 is divided by its Euclidian norm in order to result in a new matrix M2.

Then the matrix M2 is multiplied by its transpose so as to obtain a square matrix M3 with K rows and K columns, M3 being a first matrix that is a Gram matrix. The diagonal coefficients of the first matrix M3 are all equal to 1 since they correspond to the square of the Euclidian norm of the column vectors of the matrix M2, these vectors being normed during the passage from M1 to M2.

In a fifth step F5, a combined matrix M4 corresponding to a combination of the first matrix M3 with an identity matrix Id with the same dimensions as the first matrix M3.

This combined matrix M4(μ) is defined by the following equation:

$$M4(\mu) = \left(\frac{1}{\mu+1}\right)Id + \left(\frac{\mu}{\mu+1}\right)M3 \quad (14)$$

where μ is a positive or zero number to be tested and Id the identity matrix with K rows and K columns.

M4(μ) thus corresponds to a barycentric combination with positive weights of Id and M3. All the diagonal terms of the combined matrix M4 are equal to 1. This is because this matrix is the barycentre of the two matrices M3 and Id, which are both with diagonal coefficients equal to 1.

Unlike the matrix M3, the matrix M4 is now well conditioned.

The number μ is chosen for example equal to 6.

In a sixth step F6, a pseudo-inversion matrix M6 is constructed.

First of all the combined matrix M4(μ) defined above is inverted. An inverted matrix M5 is then obtained.

By multiplication of the inverted matrix M5 by the matrix M2, the pseudo-inversion matrix M6 is obtained, which is a rectangular matrix with N*M rows and K columns.

In a seventh step F7, at least one projective quantity with parameter is constructed.

An intermediate number grid is constructed, the abscissa indices of which extend from −n2 to n2 and the ordinate indices from −m2 to m2 with n2 strictly greater than n1 and m2 strictly greater than m1, the integers n1 and m1 being previously defined in step F1. The height index of this intermediate grid extends from 0 to K. For example n1=15 and m2=30 are chosen.

To do this, an index i0 between −n2+n1 and n2−n1 is selected, and an index j0 between +m2+m1 and m2−m1, and an index k0 between 1 and K, the index level k0 of the number grid (of step F2) is positioned between the indices i0−n1 and i0+n1, j0−m1 and j0+m1 in the intermediate grid so as to obtain the number level of index k0 in the intermediate grid.

The number level of index k0 of the intermediate grid thus obtained is duplicated on the K levels of this intermediate grid in order to obtain a three-dimensional intermediate number grid. The tensor product of this intermediate grid obtained by the filtering grid of step F3 is then calculated in order to obtain a filtered intermediate grid.

For each height index k (k between 1 and K), the level k of the filtered intermediate grid corresponding to a vector with N*M rows is transformed by putting the columns of this level end to end. In this way a matrix M1' with K columns and N*M rows is obtained.

By dividing each column vector of M1' by its own norm, the matrix M2' results. This matrix M2' is next multiplied by the matrix M6, defined during the above step F6, in order to supply a square matrix M7 of dimension K.

Then M6 is multiplied by the matrix M2' in order to obtain a square matrix M8 with K rows and K columns.

The matrix M7 is then multiplied by the transpose of the matrix M8. Then a square matrix M9 is obtained.

Then the matrices M7 and M8 are multiplied by their own transpose in order to give two square symmetrical matrices, denoted respectively M10 and M11.

Then the geometric index in (i0, j0, k0) is used to designate the number defined by the following expression:

$$G1(i0, j0, k0) = \frac{M9(k0, k0)}{\sqrt{M10(k0, k0) \cdot M11(k0, k0)}} \quad (15)$$

Thus the matrix M7 constitutes a first vector and the transpose of the matrix M8 a second vector.

This equation 15, which corresponds to a scalar product of the first vector and the second vector divided by the product of the norms of the first and second vectors is an angle cosine whose value is between −1 and +1.

For each of the triplets (i,j,k), the pseudo-angle f(i,j,k) corresponding to the cosine of the expression (24) is calculated in (i,j,k) by means of the following mathematical formula:

$$f(i, j, k) = 1 - \frac{\arccos(G1(i, j, k))}{\pi} \quad (16)$$

If G1(i,j,k), the cosine of the angle, equal to 1, its image is equal to 1, and if the cosine is equal to −1 its image is equal to 0. A three-dimensional grid of pseudo-angles f(i,j,k) denoted G2 is obtained.

Next the vertical curvature G3(i,j,k) of the pseudo-angle previously calculated is defined by means of the following mathematical formula:

$$G3(i, j, k) = \frac{-f''}{\left((1 + \lambda_2 \cdot f' \cdot f')^{\frac{3}{2}}\right)} \quad (17)$$

where λ2 is a parameter to be tested (it is chosen for example equal to 1), f' is the first vertical derivative given by the following mathematical formula:

$$f_k'(i,j,k)=(f(i,j,k+1)-f(i,j,k))/2 \quad (18)$$

and f'' is the second vertical derivative given by the following mathematical formula:

$$f_k''(i,j,k)=(f(i,j,k+1)-2f(i,j,k)+f(i,j,k-1)) \quad (19)$$

The first (corresponding to k=1) and last (corresponding to k=K) variables of the grid G2 defined above are not calculated, the value 0 is arbitrarily attributed to them. In this way a grid G3 of vertical curvatures is obtained.

Normalizing is carried out by dividing the maximum value obtained on the grid G3. Thus the maximum value obtained on the grid is systematically 1. This new grid that constitutes the projective quantity is denoted G4.

2.3 Calibration of the Projective Quantity

In an eighth step F8, a calibration of the projective quantity is implemented by means of a calculation of the susceptibility equivalents (according to a variant of this second embodiment, the mass equivalents or equivalents of parameters proportional to susceptibilities are calculated) in order to form a correction grid of the projective quantity.

The vector V1 is considered, a vertical vector corresponding to the central column of the grid G4 (that is to say of the projective quantity). The vector V1 has 40 height indices since there are 40 levels in the grid G4 (K=40) where each of these coordinates is no more than 1.

The vector V2 with K positive height indices (with K=40) is defined by the following equation:

$$V2(k) = \exp(\lambda 3 \cdot V1(k)) k = 1, 2, \ldots, K \qquad (20)$$

The vector V3 is defined by the following mathematical expression:

$$V3(k) = \frac{V2(k)}{V2(1) + V2(2) + \ldots + V2(k)} k = 1, 2, \ldots, K \qquad (21)$$

where each of the K coordinates of this vector V3 is positive and the sum of all the coordinates of V3 equal to 1.

The vertical reference gradient is defined by the following barycentric combination:

$$C4(k) = V3(1) \times C(1) + V3(2) \times C(2) + \ldots + V3(K) \times C(K) \qquad (22)$$

where C(k) is the extract of the level k of the number grid calculated during step F2, that is to say the vertical gradient grid of a spherical abnormality of 1 gram of pure iron situated at the index of height k multiplied by the vertical step defined at F1.

The vertical field gradient C(k) of level k and the reference vertical gradient C4(k) for this level, which are grids of abscissa between −n1 and +n and ordinate between −m1 and +m1, are transformed into a vector of size N*M. As during step E6 of the first embodiment, use is made in the aforementioned pseudo-proportionality formula (in relation to step E6) in order to calculate the pseudo-proportionality index of the vertical gradient C(k) of level k with respect to the reference vertical gradient C4($k$) of level k by virtue of the following expression:

$$\text{Correction}(k) = \frac{<C(k), C4(k)>}{<C4(k), C4(k)>} \qquad (23)$$

where (.,.) designates the canonical scalar product with C(k) and C4(k) two vectors of the same vectorial space of finite dimension, C4(k) is non-zero. When the vector C(k) can be written in the form: $\lambda \cdot C4(k)$ where k is a number, Correction (k) is equal to the number lambda.

This step is repeated for each height index k (varying from 1 to K). In the example chosen, n1 is equal to 10 and m1 is equal to 20, the coefficient lambda3 is equal to 2.

This number Correction(k) will make it possible to adjust the projective quantity corresponding to the index k.

Figure 8:
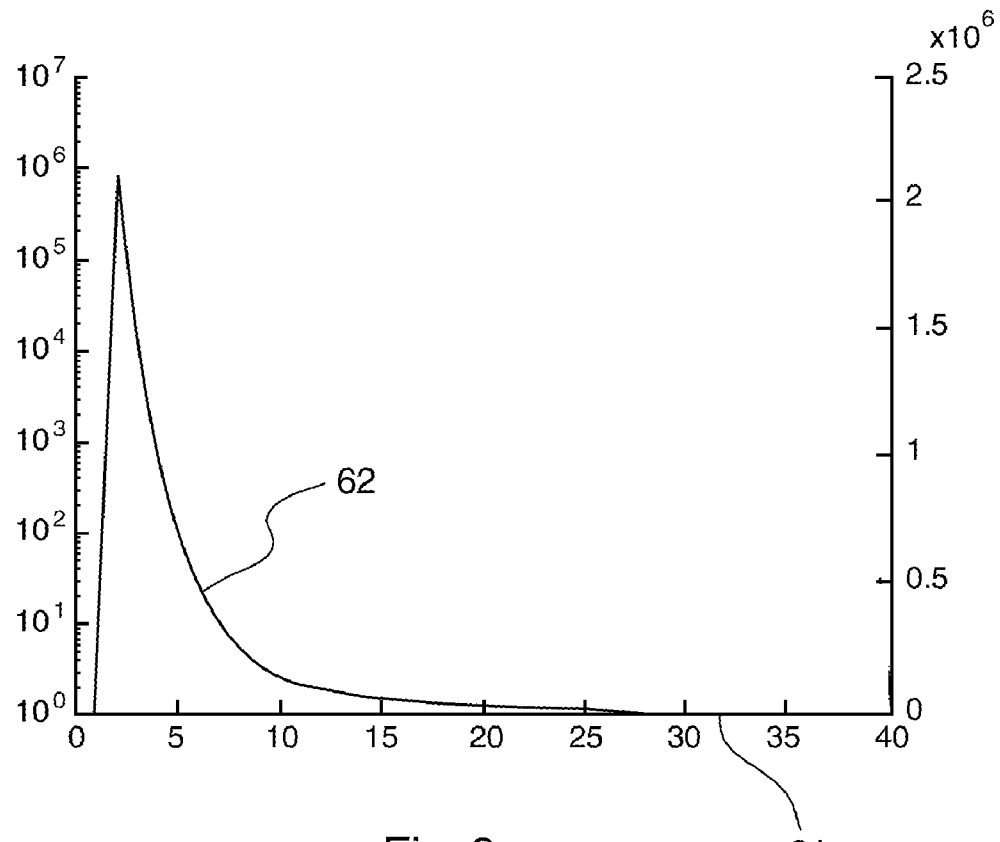
FIG. 8 is a graph presenting the logarithm of the pseudo-proportionality index Correction(k) as a function of the depth (abscissa axis) in the context of the second embodiment.

There is presented, in relation to FIG. 8, the logarithm of the pseudo-proportionality index Correction(k) 62 as a function of the depth 61 (abscissa axis).

2.4 Application of the Projective Quantity to the Values of the Recordings

In a ninth step F9, a grid of recorded values of the vertical magnetic field gradient is calculated from the magnetic map of recorded values of the vertical magnetic field gradient. The coordinates (i,j) in the magnetic map correspond to the point i multiplied by the abscissa step and j multiplied by the ordinate step.

Unlike the location method according to the first embodiment (the case of the total field and the helicopter reading), in the location method according to this second embodiment, a step of interpolation of the recorded values so as to obtain an interpolation grid is not implemented.

In a tenth step F10, for a pair (i,j) chosen in the recorded value grid, a zone is selected delimited by the indices i−n1 and i+n1, and j−m1 and j+m1, and its affine residual is calculated by affine projection of this delimited zone of the recorded value grid by implementing the method of least squares as described in relation to step E9 of the first embodiment.

The affine residual of this projection is obtained, this affine residual comprising a plurality of projected values forming a projected value grid of size N*M.

This projected value grid is duplicated on K levels. A transformed three-dimensional grid of N rows, M columns and K levels is then obtained, each of the K levels being identical to all the others.

The tensor product of this three-dimensional grid transformed by the filtering grid calculated at step F3 is then effected. A second filtered three-dimensional grid is then obtained.

By using the technique applied to the first filtered matrix in the fourth step F4, in an eleventh step F11, the second filtered three-dimensional grid (obtained in step F10) is modified as a matrix of N*M rows and K columns called MF, by transforming each of the K levels of this second filtered grid into a column vector.

Each column vector of this matrix M1' is then divided by its norm and thus a matrix M2' is obtained.

Next this matrix M2' is multiplied by the matrix M6 calculated at step F7. Then a square matrix with K rows and K columns denoted M7' is obtained.

The matrix M6 is next multiplied by the matrix M2' in order to obtain a square matrix M8 of K rows and K columns.

The product of the matrix M7' and the transpose of the matrix M8' supplies the square matrix M9' of size K, and the product of the matrices M7' and M8' multiplied by their transpose supplies respectively the symmetrical square matrices M10' and M11'.

The geometric index in (i0,j0,k0) designates the number defined by the following expression:

$$G1'(i0, j0, k0) = \frac{M9'(k, k)}{\sqrt{M10'(k, k) \cdot M11'(k, k)}} \qquad (24)$$

Thus the matrix M7' constitutes a first vector and the transpose of the matrix M8' a second vector.

This equation (24), which corresponds to a scalar product of the first vector and the second vector divided by the product of the norms of the first and second vectors, is an angle cosine and its value is between −1 and +1.

For each of the triples (i,j,k), the pseudo angle f1(i,j,k) corresponding to the cosine of expression (24) in (i,j,k) is calculated by means of the following mathematical formula:

$$f1(i, j, k) = 1 - \frac{acos(G1'(i, j, k))}{\pi} \quad (25)$$

If the cosine of the angle G1 (i,j,k) is equal to 1, its image is equal to 1, and if the cosine is equal to −1, its image is equal to 0. The grid of the pseudo-angles f1(i,j,k) is denoted G2.

Using the expression (17) (defined in relation to step F7), the vertical curvature G3'(i,j,k) of the pseudo-angle previously calculated is next obtained.

The first (corresponding to k=1) and last (corresponding to k=K) levels of the grid G2' defined above are not calculated, and the value 0 is attributed to them arbitrarily.

Then the three-dimensional grid G3' of vertical curvatures is obtained.

Next a three-dimensional grid G4' is defined, with the same size as G3', attributing to each tri-index (i,j,k) the value 1 when the second derivative on the abscissa is defined by the following mathematical formula:

$$G3'(i+1,j,k)-2G3'(i,j,k)+G3'(i-1,j,k) \quad (26)$$

and the second derivative on the ordinate defined by the following mathematical formula:

$$G3'(i,j+1,k)-2G3'(i,j,k)+G3'(i,j-1,k) \quad (27)$$

are negative or zero, and 0 in the contrary case.

Next the tensor product of G4' and G3' is effected in order to obtain a three-dimensional grid G5'.

In a twelfth step F12, a vector of estimated susceptibilities is calculated (according to a variant of this embodiment, it is a mass vector or a vector of parameters proportional to susceptibilities).

To do this, a sub-grid of appropriate size is selected from the grid of recorded values of the vertical gradient of the two-dimensional magnetic field. This zone is situated between the abscissae i−n1 and i+n1 and between the ordinates j−m1 and j+m1. Then the affine residual of this sub-grid is calculated in the same way as in step F10.

In the same way as in step F7, the angle cosine vector (also referred to as the geometric index vector) is determined, comprising K height indices, from the grid G5' defined in step F11 above.

As in step F8, from the reference vertical gradient, the pseudo-proportionality index of the affine residual of the zone is determined with respect to the reference vertical gradient.

Next the pseudo-proportionality index is multiplied by the angle cosine vector in order to result in the vector Susceptibility 1.

Finally, each k-th coordinate of the vector Susceptibility1 is divided by the corresponding corrective term Correction(k) determined at step F8. Then the vector susceptibility2 is obtained.

In a thirteenth step F13, a verification of the susceptibilities calculated in step F12 is implemented.

To do this, a magnetic field is reconstituted by adding to all the tri-indices (i,j,k) the variation in the total magnetic field caused by a point abnormality situated at (i,j,k) and the susceptibilities of which are calculated at step F12.

At least one embodiment provides a technique for locating a magnetic object that is precise and effective.

At least one embodiment provides such a technique that makes it possible to determine both the three-dimensional location and the susceptibility of a magnetic object.

At least one embodiment uses such a technique that provides a check on the measurement error at each calculation step.

Yet another aspect of the disclosure proposes a technique that is easy to implement at reasonable cost.

Although the present disclosure has been described with reference to one or more examples, workers skilled in the art will recognize that changes may be made in form and detail without departing from the scope of the disclosure and/or the appended claims.

The invention claimed is:

1. A method of locating a magnetic object disposed in a environment in which a system of coordinates is defined comprising an abscissa axis, an ordinate axis and a height axis, said method comprising:
    a phase of measuring at least one magnetic parameter at a plurality of measuring points in the environment in order to obtain a plurality of recorded values of this parameter at the said measuring points that form a grid of recorded values;
    a phase of exploiting the recorded values, comprising the following steps, at least one of which being performed by a computer:
        constructing at least a first vector and at least a second vector;
        obtaining at least one pseudo angle formed by said at least one first vector and said at least one second vector;
        obtaining at least one vertical curvature of a function of at least one pseudo angle with respect to height along the height axis; and
        applying said at least one vertical curvature to the recorded values in order to obtain an estimated value of a parameter proportional to a susceptibility at a plurality of estimated points in the environment making it possible to obtain a location of said object.

2. The method according to claim 1, wherein said exploitation phase also comprises a step of choosing a calculation grid comprising calculation points situated in said environment.

3. The method according to claim 1, wherein the magnetic parameter at a given point, referred to as the total magnetic field at said given point, is equal to the magnetic field at said given point from which a mean magnetic field in the environment is subtracted.

4. The method according to claim 3, wherein:
    said substep of constructing the first and second vectors comprises the following substeps:
        obtaining a unitary vector carrying the mean magnetic field in the environment, and
        for each calculation point on the calculation grid, association of a number obtained from the scalar product of said unitary vector and the total magnetic field at a first reference point when a first reference magnetic element is situated at a second reference point, in order to obtain a number grid, each of said numbers being located in the grid by an abscissa index, an ordinate index and a height index, the number grid comprising a plurality of number levels, a height index of the number grid corresponding to each number level;
    for each number level of the number grid, said substep of constructing the first and second vectors also comprises the following substep:

obtaining the first vector from said number level and, for each height index of the number grid, a second vector from the number level corresponding to said height index.

5. The method according to claim 3, wherein in the substep of obtaining a pseudo angle formed between said at least one first vector and said at least one second vector, the following formula is used: said $$\text{pseudo angle} = 1 - \left(\frac{1}{\pi}\right) \arccos(g)$$

where g is the cosine of said pseudo angle.

6. The method according to claim 3, wherein, in the substep of obtaining a vertical curvature of said function of the pseudo angle according to said height, the following formula is used: the vertical $$\text{curvature} = \frac{-f''}{\left((1 + \lambda_2 \cdot f' \cdot f')^{\frac{3}{2}}\right)}$$

where f is said function of the pseudo-angle with respect to said height, f' is the first derivative of said function of the pseudo-angle with respect to said height and f'' is the second derivative of said function of the pseudo-angle with respect to said height and $\lambda_2$ is a parameter of adjusting said at least one vertical curvature.

7. The method according to claim 3, wherein said exploitation phase also comprises a step of calibrating said at least one vertical curvature comprising the following sub steps implemented iteratively:
calculating at least one first data item proportional to a susceptibility of at least one second reference magnetic element introduced into said environment;
adjusting said at least one vertical curvature according to said at least one data item.

8. The method according to claim 3, wherein the step of applying said at least one vertical curvature to the recorded values comprises a preliminary substep of affine projection of at least part of the recorded value grid by a method of least squares and obtaining an affine residual of said projection of said at least one part of the recorded value grid, said affine residual comprising a plurality of projected values forming a projected value grid.

9. The method according to claim 8, wherein the step of applying said at least one vertical curvature to the recorded values also comprises a preliminary substep of interpolating said recorded values so as to obtain an interpolation grid comprising interpolated values each corresponding to a calculation point in a subset of calculation points for the calculation grid, said preliminary interpolation substep being implemented before said preliminary affine projection substep.

10. The method according to claim 8, wherein the step of applying said at least one vertical curvature to the recorded values also comprises the following substeps implemented for each of said projected values of the grid of projected values:
constructing a third vector from the number grid and the projected value grid;
applying said at least one vertical curvature to said third vector in order to obtain a fourth vector;
calculating said estimated value of the parameter proportional to a susceptibility at the plurality of points estimated from the fourth vector.

11. The method according to claim 8, wherein the step of applying said at least one vertical curvature to the recorded values also comprises the following substep implemented for each of said projected values of the grid of projected values:
correcting said value of said parameter by at least one item of information obtained in said calibration step.

12. The method according to claim 3, wherein said calculation points are situated between a height of 10 m and a height of −45 m.

13. The method according to claim 1, wherein the magnetic parameter at a given point comprises a vertical magnetic field gradient between a first point and a second point situated respectively at a first height and a second height, said first and second points having the same abscissa and the same ordinate as said given point.

14. The method according to claim 13, wherein:
said substep of constructing the first and second vectors comprises the following substeps:
obtaining a unitary vector carrying the mean magnetic field in the environment, and
for each calculation point of the calculation grid, associating a number obtained from the scalar product of said unitary vector and the vertical magnetic field gradient between first and second reference points when a first reference magnetic element is situated at a third reference point, in order to obtain a number grid, each of said numbers being located in the grid by an abscissa index, an ordinate index and a height index;
filtering the number grid in order to obtain a filtered grid of filtered numbers, by a filtering grid comprising filtering numbers, each of the filtering numbers being located in the filtering grid by an abscissa index, an ordinate index and a height index and each of the filtering numbers being obtained from its abscissa, ordinate and height indices;
calculating the first vector and the second vector by a diagonal extraction technique using the filtered grid.

15. The method according to claim 14, wherein said substep of calculating the first and second vectors comprises the following substeps:
obtaining a first matrix of the Gram matrix type from columns of the filtered grid;
obtaining a combined matrix corresponding to a combination of the first matrix with an identity matrix possessing the same dimensions as the first matrix;
inversion of said combined matrix in order to obtain an inverted matrix;
multiplying the inverted matrix by a matrix obtained from the columns of the filtered grid.

16. The method according to claim 14, wherein said filtering substep is performed using a tensor product between the number grid and the filtering grid.

17. The method according to claim 13, wherein in the substep of obtaining a pseudo angle formed between said at least one first vector and said at least one second vector, the following formula is used: said $$\text{pseudo angle} = 1 - \left(\frac{1}{\pi}\right)\arccos(G1)$$

where G1 is the cosine of said pseudo angle.

18. The method according to claim 13, wherein, in the substep of obtaining a vertical curvature of said function of the pseudo-angle with respect to said height, the following formula is used: the vertical $$\text{curvature} = \frac{-f''}{\left((1 + \lambda_2 \cdot f' \cdot f')^{\frac{3}{2}}\right)}$$

where f is said function of the pseudo-angle with respect to said height, f' is the first derivative of said function of the pseudo-angle with respect to said height and f'' is the second derivative of said function of the pseudo-angle with respect to said height and $\lambda_2$ is a parameter of adjusting said at least one vertical curvature.

19. The method according to claim 13, wherein said exploitation step also comprises a step of calibrating said at least one vertical curvature comprising the following substeps implemented iteratively:
   calculating at least one first data item proportional to a susceptibility of at least one second reference magnetic element introduced into said environment;
   adjusting said at least one vertical curvature according to said at least one data item.

20. The method according to claim 13, wherein in that the step of applying said at least one vertical curvature to the recorded values comprises a preliminary substep of affine projection of at least part of the recorded value grid by a method of least squares and obtaining an affine residual of said projection of said at least part of the recorded value grid, said affine residual comprising a plurality of projected values forming a projected value grid.

21. The method according to claim 20, wherein the step of applying said at least one vertical curvature to the recorded values also comprises the following substeps, implemented for each of the projected values of the projected value grid:
   constructing a third vector from the number grid and the projected value grid;
   applying said at least one vertical curvature to said third vector in order to obtain a fourth vector;
   calculating said estimated value of the parameter proportional to a susceptibility at a plurality of estimated points using the fourth vector.

22. The method according to claim 20, wherein the step of applying said at least one vertical curvature to the recorded values also comprises the following substep implemented for each of said projected values of the grid of projected values:
   correcting said value of said parameter by at least one item of information obtained in said calibration step.

23. The method according to claim 13, wherein said calculation points are situated between a height of 0 m and a height of −3 m.

24. A non-transitory computer-readable storage medium, storing a computer program comprising a set of instructions executable by said computer in order to implement a method of locating a magnetic object disposed in a environment in which a system of coordinates is defined comprising an abscissa axis, an ordinate axis and a height axis, when said instructions are executed on a computer, said method comprising:
   a phase of measuring at least one magnetic parameter at a plurality of measuring points in the environment in order to obtain a plurality of recorded values of this parameter at the said measuring points that form a grid of recorded values;
   a phase of exploiting the recorded values, comprising the following steps:
      constructing at least a first vector and at least a second vector;
      obtaining at least one pseudo angle formed by said at least one first vector and said at least one second vector;
      obtaining at least one vertical curvature of a function of at least one pseudo angle with respect to height along the height axis; and
      application of the at least one vertical curvature to the recorded values in order to obtain an estimated value of a parameter proportional to a susceptibility at a plurality of estimated points in the environment making it possible to obtain a location of said object.

25. A device for locating a magnetic object disposed in an environment in which there is defined a system of coordinates comprising an abscissa axis, an ordinate axis and a height axis, said device comprising:
   means of measuring at least one magnetic parameter at a plurality of measuring points in the environment in order to obtain a plurality of recorded values of this parameter at said measuring points that form a recorded value grid;
   means of exploiting said recorded values, comprising:
      means of constructing at least a first vector and at least a second vector;
      means of determining at least one pseudo angle formed by said at least one first vector and said at least one second vector;
      means of obtaining at least one vertical curvature of a function of at least one pseudo angle with respect to height along the height axis; and
      means of applying said at least one vertical curvature to said recorded values in order to obtain an estimated value of a parameter proportional to a susceptibility at a plurality of estimated points in the environment making it possible to obtain a location of said object.

* * * * *

UNITED STATES PATENT AND TRADEMARK OFFICE
CERTIFICATE OF CORRECTION

PATENT NO. : 8,359,161 B2  Page 1 of 1
APPLICATION NO. : 12/303692
DATED : January 22, 2013
INVENTOR(S) : Bruno Wirtz It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 638 days.

Signed and Sealed this

First Day of September, 2015

Michelle K. Lee
*Director of the United States Patent and Trademark Office*